(12) United States Patent
Gerardo et al.

(10) Patent No.: US 8,378,213 B1
(45) Date of Patent: Feb. 19, 2013

(54) ADJUSTABLE FLOOR BRACKET ARTICLES AND METHODS

(75) Inventors: Joseph R. Gerardo, Victorville, CA (US); Steven Lee Purves, Tigard, OR (US)

(73) Assignee: Fabworks, LLC, Santa Ana, CA (US)

( * ) Notice: Subject to any disclaimer, the term of this patent is extended or adjusted under 35 U.S.C. 154(b) by 271 days.

(21) Appl. No.: 12/540,969

(22) Filed: Aug. 13, 2009

Related U.S. Application Data (63) Continuation-in-part of application No. 12/016,079, filed on Jan. 17, 2008, now Pat. No. 7,592,542, which is a continuation of application No. 10/865,152, filed on Jun. 9, 2004, now Pat. No. 7,394,020, which is a continuation of application No. 10/389,293, filed on Mar. 14, 2003, now Pat. No. 6,765,146.

(51) Int. Cl.
*H01H 9/02* (2006.01)

(52) U.S. Cl. ............... 174/58; 174/57; 174/61; 174/481; 220/3.2; 220/3.3; 248/906

(58) Field of Classification Search ............... 174/50, 174/53, 480, 481, 58, 64, 54, 57, 61, 62; 220/3.2–3.9, 4.02; 248/906, 300, 27.1, 205.1, 248/311.2; 439/535; 52/220.7, 220.8
See application file for complete search history.

(56) References Cited

U.S. PATENT DOCUMENTS

| | | | | |
|---|---|---|---|---|
| 4,790,505 A * | 12/1988 | Rose et al. | .............. | 248/906 |
| 5,098,046 A | 3/1992 | Webb | | |
| 5,224,673 A | 7/1993 | Webb | | |
| 5,423,499 A | 6/1995 | Webb | | |
| 5,931,425 A * | 8/1999 | Oliva | .............. | 174/58 |
| 6,098,939 A | 8/2000 | He | | |
| 6,188,022 B1 | 2/2001 | He | | |
| 6,323,424 B1 | 11/2001 | He | | |
| 6,590,155 B2 * | 7/2003 | Vrame et al. | .............. | 174/50 |
| 6,803,521 B2 * | 10/2004 | Vrame | .............. | 174/58 |
| 7,053,300 B2 * | 5/2006 | Denier et al. | .............. | 174/58 |
| 7,394,020 B2 * | 7/2008 | Gerardo | .............. | 174/58 |
| 7,521,631 B2 * | 4/2009 | Dinh | .............. | 174/58 |
| 7,592,542 B1 * | 9/2009 | Gerardo | .............. | 174/58 |

* cited by examiner

*Primary Examiner* — Angel R Estrada
(74) *Attorney, Agent, or Firm* — Howard N. Sommers (57) ABSTRACT

A support bracket article for enabling the adjustable positioning of an electrical box enclosure relative to the bottom of a framing member, and the supporting thereof in an interior wall section of a wall system under construction. The article is able to guide the adjustable positioning of the electrical box enclosure. It is also able to accommodate the supporting and adjustable positioning of the electrical box enclosure in a variety of framing studs and wall systems.

9 Claims, 8 Drawing Sheets

ADJUSTABLE FLOOR BRACKET ARTICLES AND METHODS

CROSS-REFERENCE TO REALATED APPLICATION

This application is a continuation-in-part of co-pending application Ser. No. 12/016,079, filed Jan. 17, 2008, which is a continuation of application Ser. No. 10/865,152, filed Jun. 9, 2004, now U.S. Pat. No. 7,394,202, which is a continuation of application Ser. No. 10/389,293, filed Mar. 14, 2003, now U.S. Pat. No. 6,765,146.

BACKGROUND OF THE INVENTION

1. Field of the Invention

This invention is generally related to electrical box enclosure articles and methods, and, more particularly, to a support bracket article and method for enabling the adjustable positioning of an electrical box enclosure relative to the bottom of an interior wall section framing member.

2. General Background and State of the Art

Electrical box enclosures are mounted in walls which include framing members during wall construction in structures. Such electrical box enclosures have been mounted onto studs in the wall, but it has been a problem to adjust the location of the electrical box enclosure relative to the position of the studs. They have also been mounted on the bottom of a framing member, providing additional versatility in the location thereof, but adjustment thereof relative to the bottom of the framing member has been difficult.

Therefore, there has been identified a need to provide an article which is able to support an electrical box enclosure during wall construction so as to enable the adjustable positioning of the electrical box enclosure in relation to the bottom of a framing member.

INVENTION SUMMARY

Briefly, and in general terms, the present invention, in a preferred embodiment, by way of example, is directed to the adjustable positioning and supporting of an electrical box enclosure in relation to the bottom of an interior wall section framing member.

In accordance with aspects of the invention, there is provided an electrical box enclosure to be supported and adjustably positionable therein during wall construction, relative to the bottom of a framing member in an interior wall section. The article includes an adjustable positioning enabling section, for enabling the electrical box enclosure to be adjustably positionable therein. It also includes a supporting section, for supporting the adjustable positioning enabling section.

In other aspects of the invention, the article provides adjustable portions, for enabling the article to accommodate the adjustable positioning of the electrical box enclosure in walls constructed of different types of framing studs.

In yet other aspects of the invention, the article provides portions for guiding the adjustable positioning of the electrical box enclosure.

Another aspect of the invention is that the article includes portions for providing support for the electrical box enclosure in various types of wall systems under construction.

In further aspects of the invention, the article includes a supporting section which includes a front portion, the front portion includes a top portion, and an opening which is elongated and enlarged and which is proximate the top portion, which enables an electrical junction box to clamp the article between the a ring and the electrical junction box to be adjustably positionable relative thereto.

In still further aspects of the invention, the article includes an adjustable positioning enabling section which includes a pair of opposed side portions which are bendable, each bendable side portion includes a plurality of holes spaced apart therealong, and a plurality of markings proximate each side portion hole, including a first set of markings which indicate positioning of the electrical junction box from the center of a stud outwardly in a generally horizontal direction, and a second set of markings which indicate positioning of the electrical junction box from the floor upwardly in a generally vertical direction.

In other aspects of the invention, the article includes an adjustable positioning enabling section which includes a pair of opposed side portions which are bendable, each of which includes a plurality of holes spaced apart therealong, each hole able to receive a connector which is able to connect with a corresponding hole in a standard electrical junction box, for enabling securing the electrical junction box to the support bracket.

These and other aspects and advantages of the invention will become apparent from the following detailed description and the accompanying drawings, which illustrate by way of example the features of the invention.

DETAILED DESCRIPTION OF THE PREFERRED EMBODIMENTS

Referring to the drawings, in which like reference numerals refer to like parts, and in particular to FIGS. 1-7, there is shown an article comprising a support bracket 10, for enabling an electrical box enclosure 12 (FIG. 4) to be adjustably positionable therein relative to the bottom of a framing member 14, in an interior wall section 16 during wall construction.

Figure 1:
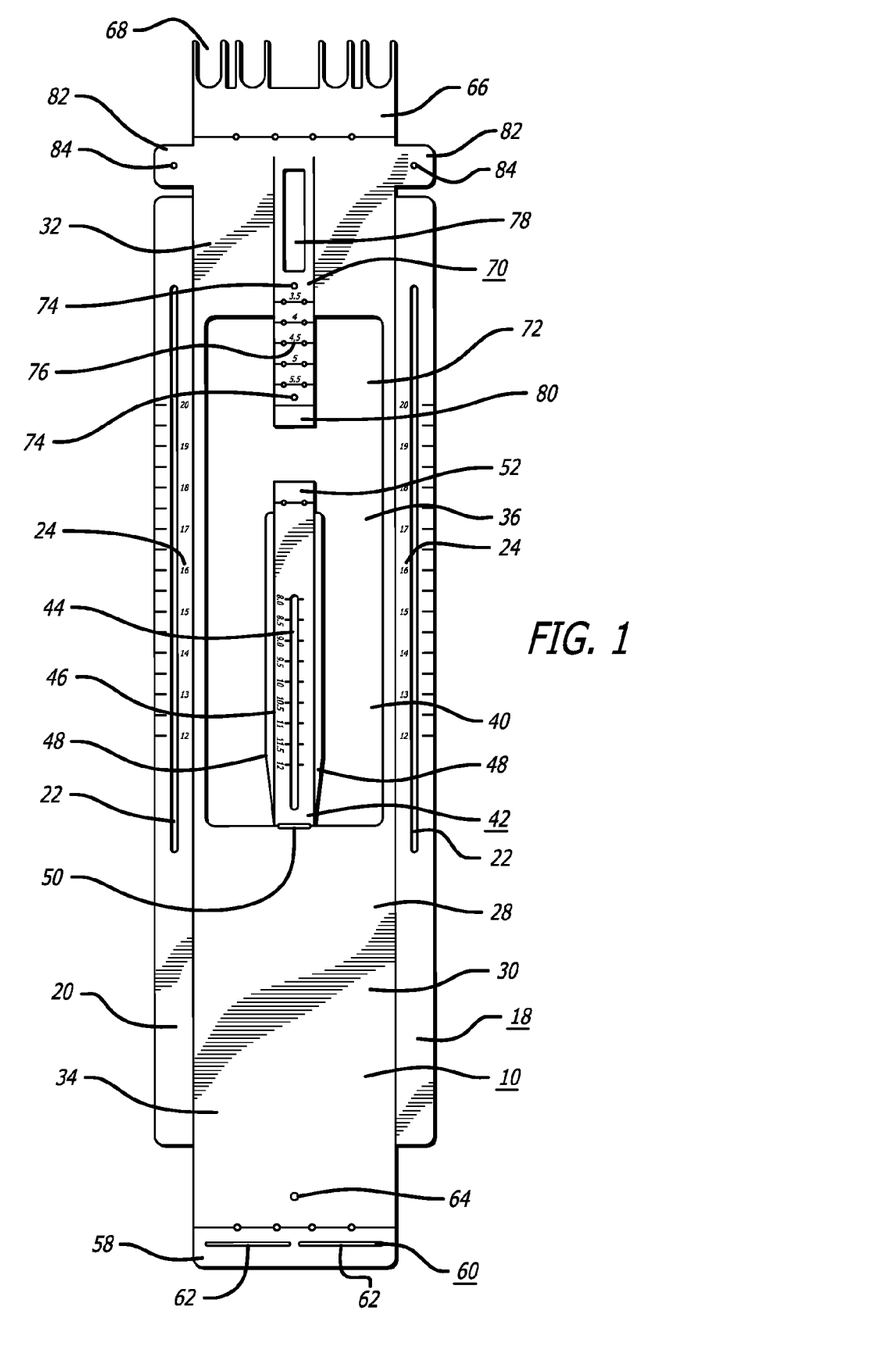
FIG. 1 is a front elevational view of a support bracket in the present invention.
Figure 4:
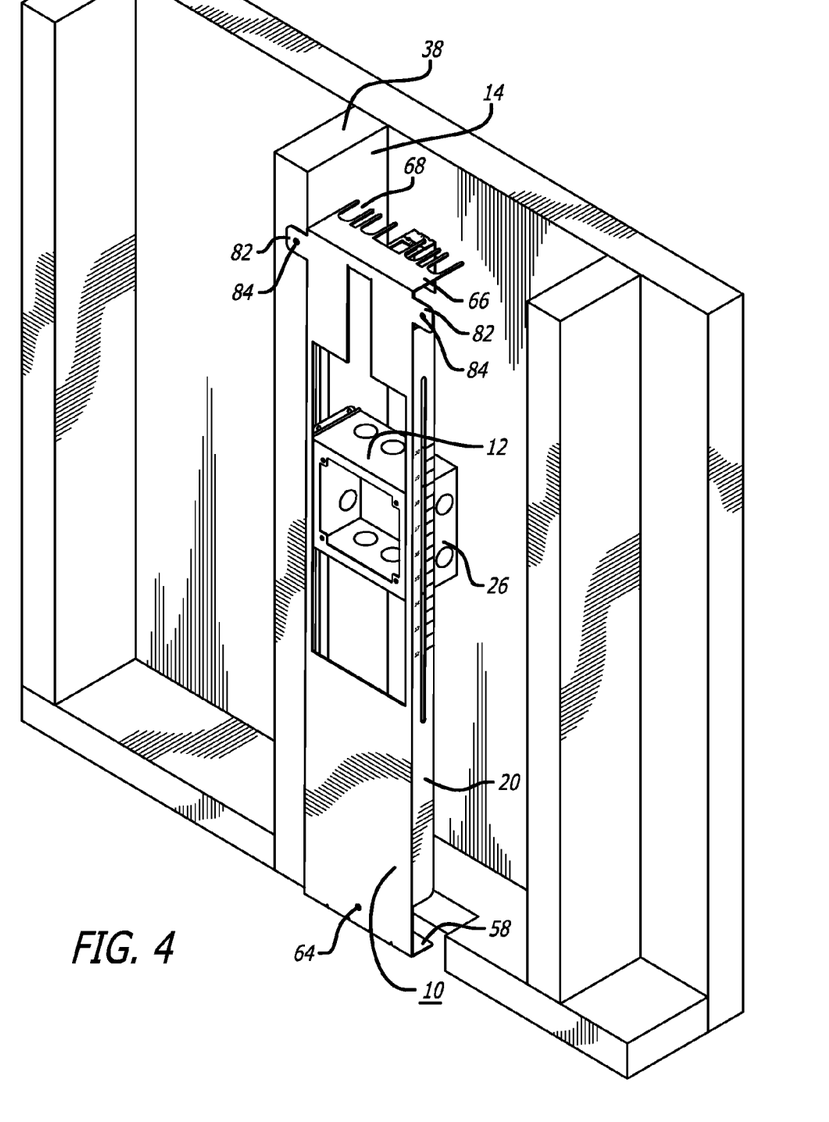
FIG. 4 is a perspective view of a support bracket article including bent and detached portions, and an electrical box enclosure supported therein, in a stud wall system.
Figure 5:
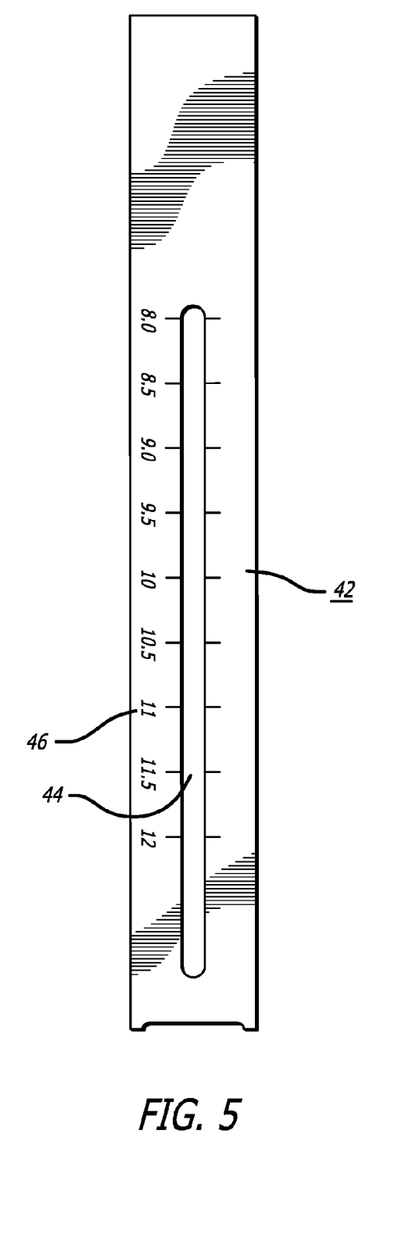
FIG. 5 is a front elevational view of a bracket extension arm section including a bent portion, of a support bracket article.
Figure 6:
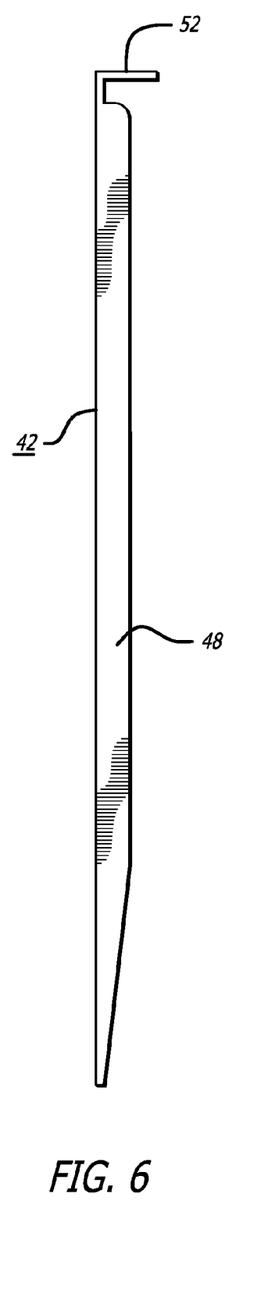
FIG. 6 is a side elevational view of a bracket extension arm section of a support bracket article.

FIG. 1 presents the support bracket 10, which includes an adjustable positioning enabling section 18 for enabling the electrical box enclosure to be adjustably positionable therein. The adjustable positioning enabling section 18 includes side positioning portions 20 of the support bracket 10, shown in template form, which are bendable at about ninety degrees to form a channel guide for the electrical box enclosure 12, as seen in FIG. 4. The side positioning portions 20 each have a slot 22 extending therealong, for enabling adjustable positioning of the electrical box enclosure 12 in the support bracket 10. The slots 22 allow for up and down adjustment of the electrical box enclosure 12, as well as a machine screw attachment of the electrical box enclosure 12 to a floor bracket. The side positioning portions 20 each also include indicia 24 along the slot 22 therein, for indicating the adjustable positioning for the electrical box enclosure 12 therein. The electrical box enclosure 12 includes a pair of sides 26, and a pair of pointers, one on each side, and the indicia 24 in the support bracket 10 are alignable with the pointers on the electrical box enclosure 12 for alignment thereof.

The support bracket 10 further includes a supporting section 28, for supporting the adjustable positioning enabling section 14. The supporting section 28 includes a front portion 30 of the support bracket 10. The front portion 30 includes an upper portion 32 and a lower portion 34, and has an opening 36 for enabling the electrical box enclosure 12 to be mounted therein. A framing member 14 in an interior wall section 16 includes one of a plurality of different thickness framing studs 38.

Referring to FIGS. 1 and 5-7, the front portion opening 36 of the support bracket 10 includes a bottom portion 40, and a bracket extension arm 42 which extends from the lower portion 34 of the support bracket front portion 30 into the bottom portion 40 of the opening 36. The bracket extension arm 42 is bendable, and enables the securing of the support bracket 10 to one of the plurality of different thickness framing studs 38. The bracket extension arm 42 has a slot 44 extending therealong, for enabling a slide type adjustment over the front portion 30 of the support bracket 10. The bracket extension arm 42 also includes indicia 46 along the slot 44 therein, and elongated side portions 48, which are bendable. The bracket extension arm 42 further includes a separation-enabling portion 50, for enabling separation thereof from the front portion 30. The bracket extension arm 42 also includes an end flange 52 which is bendable.

Figure 7:
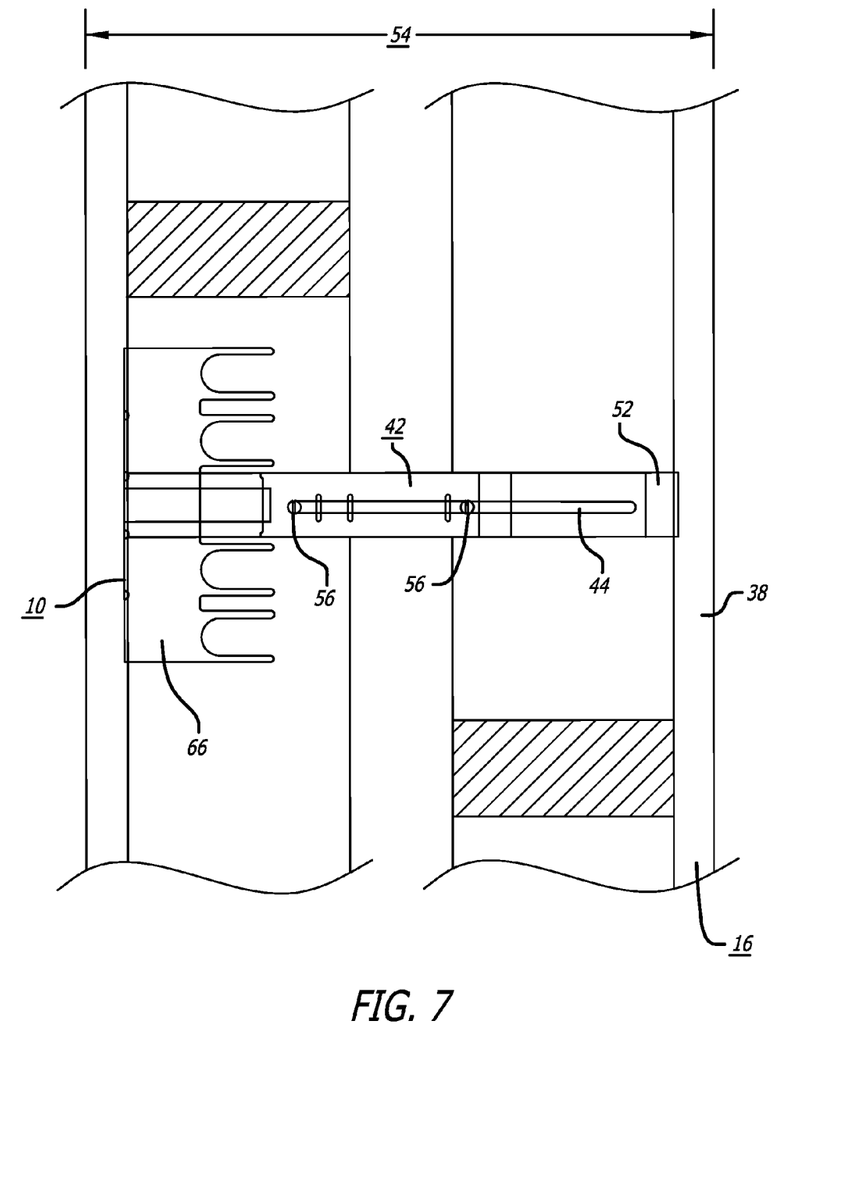
FIG. 7 is a top plan view of a bracket extension arm section of a support bracket article in a stud wall system.

There is shown in top view in FIG. 7, the end flange 52 of the bracket extension arm 42 which is bent approximately ninety degrees after tool forming, to provide a flat surface area for the bracket extension arm 42, when pushed against the inside of the interior wall material. An overall outside dimension 54 of a pair of finished wall surfaces may vary depending upon construction plan drawings or specifications for a particular project. A pair of accessible screws 56 enable adjustment of the bracket extension arm 42 within the interior of the wall. The end flange 52 of the bracket extension arm 42 bears against one side while supporting the upper portion of the support bracket 10 in stud wall systems against the exterior of the opposite side. The bracket extension arm 42 is able to support the upper portion of the support bracket 10 in stud wall systems beyond stud wall construction, such as in a staggered or double wall stud wall system as shown in FIG. 7.

The lower portion 34 of the front portion 30 of the support bracket 10 includes a bottom portion 58 which is bendable. The bottom portion 58 includes a separation-enabling portion 60 for enabling separation of the bottom portion 58 from the front portion 30. The separation-enabling portion 60 further comprises a pair of slots 62 extending along the bottom portion 58. The lower portion 34 of the support bracket front portion 30 further includes a hole 64 for enabling the securing of the support bracket 10 to the bottom of the framing member 14. The upper portion 32 of the support bracket front portion 30 further includes a top portion 66 which is bendable. The top portion 66 includes a plurality of slots 68, each able to receive a cable therein. Each of the plurality of slots 68 is generally u shaped.

The front portion 30 of the support bracket 10 also includes an upper support arm 70 which extends from the support bracket upper portion 32 into an upper portion 72 of the support bracket front portion opening 36, which is bendable, and which enables securing thereof to the framing member 14. The upper support arm 70 includes a plurality of holes 74 therein for enabling the securing thereof to the framing member 14. The framing member 14 in the interior wall section 16 includes one of a plurality of different thickness framing studs 38. The upper support arm 70 also includes indicia 76 associated therewith. The associated indicia 76 enables the securing of the upper arm support 68 to one of the plurality of different thickness framing studs 38. The upper support arm 68 further includes a strengthening portion 78 for strengthening the support bracket 10, and an end flange 80 which is bendable.

The support bracket 10 also includes side tab portions 82 which enable mounting of the article to the framing member 14. Each side tab portion 82 has a hole 84 therein for enabling mounting of the support bracket 10 to the framing member 14.

To use the article of the present invention, as illustrated in FIGS. 1-7, in a method for use of the article 10, the user may utilize the support bracket 10 to adjustably position the electrical box enclosure, by the adjustable positioning enabling section 18 thereof, and may support the support bracket 10 by the supporting section 28 thereof.

Figure 2:
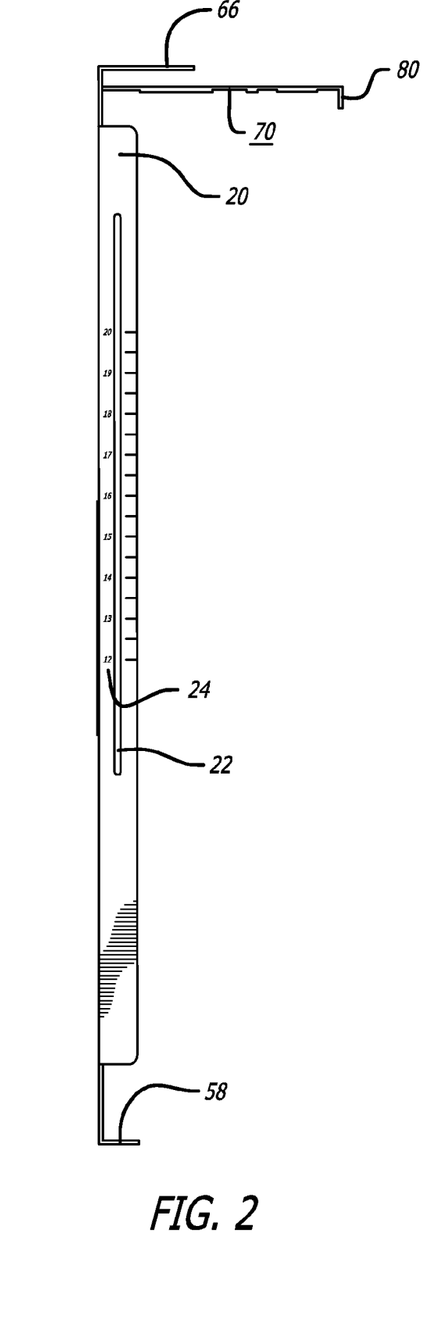
FIG. 2 is a side elevational view of a support bracket article including bent portions.
Figure 3:
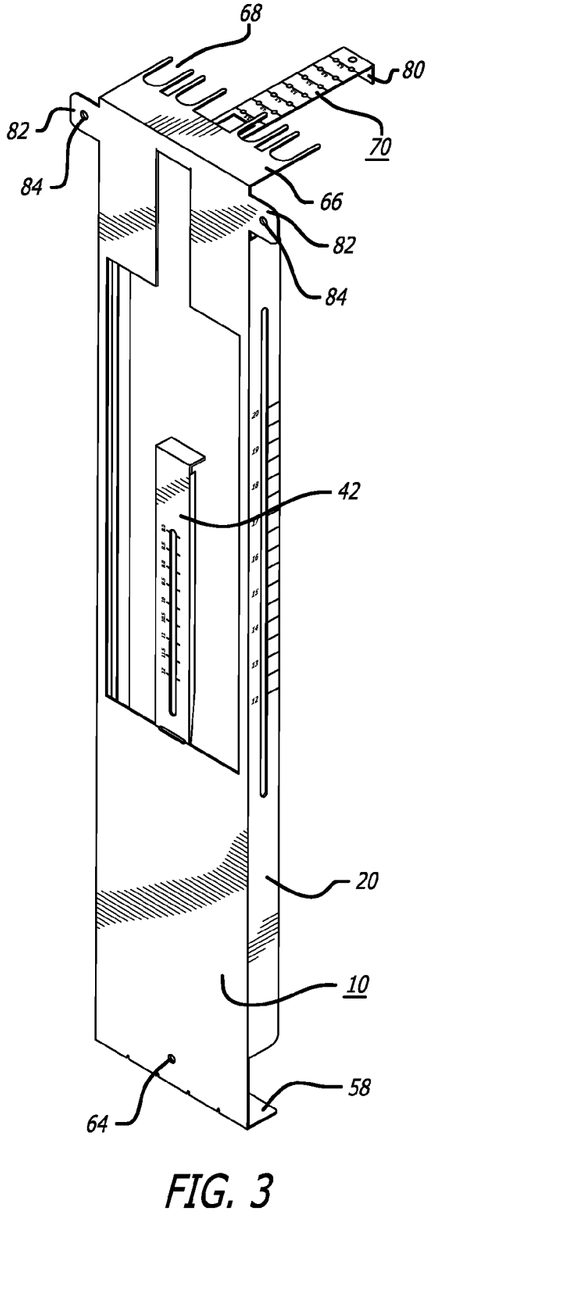
FIG. 3 is a perspective view of a support bracket article including bent portions in the present invention.

Initially the support bracket 10 is a flat template, as shown in FIG. 1, which may be formed by bending the sections thereof. The bottom portion 58 may be bent ninety degrees to form a foot for the support bracket 10, as seen in FIG. 2. The slots 62 in the bottom portion 58 enable the breaking off thereof for the installation of the support bracket 10 on wood framing, or if the support bracket 10 cannot be positioned inside the bottom track of a metal stud. The support bracket 10 may be secured to the bottom of a framing member through the holes 64, as illustrated in FIG. 4.

The side positioning portions 20 of the support bracket 10 are able to be bent ninety degrees to form a channel guide for the electrical box enclosure 12. The slots 22 one on each side of the support bracket 10, enable up and down adjustment of the electrical box enclosure 12, and also enable attachment of the support bracket 10 to the electrical box enclosure 12 by inserting machine screws therethrough. The indicia 24 on the side positioning portions 20, such as tic marks and numbers, indicate the height to the center of the electrical box enclosure 10 above the finished floor or the top of a grade surface. The electrical box enclosure 12 includes arrow shaped pointers, one on each side thereof and centered, to enable alignment of the tic marks on the side positioning portions 20 therewith, for precise height adjustment of the electrical box enclosure 12. The opening 36 in the front portion 30 of the support bracket 10 enables vertical adjustment of the electrical box enclosures 12 while attached to the support bracket 10. The side tab portions 82 of the support bracket 10 are able to be bent ninety degrees, as indicated in FIG. 2, to enable securing of the upper portions 32 of the support bracket 10 to a framing stud 38. The top portion 66 of the support bracket 10 may also be bent ninety degrees, and the slots 68 therein enable cables or conduits to be secured therein by crimping together and twisting the ends thereof to tie off cables or conduits using hand tools.

In the upper support arm 70, the holes 74 enable the attachment of a bracket extension arm 42 thereto by self-tapping fasteners inserted therethrough. The upper indicia 76 of the upper support arm 70 provide a point for the installer to bend the upper portion of the upper support arm 70 ninety degrees for forming thereof for use in the construction of walls comprised for example of three-and-one-half inch framing studs. The middle indicia 76 of the upper support arm 70 provide a point for the installer to bend the upper portion of the upper support arm 70 ninety degrees for forming thereof for use in the construction of walls comprised for example of four inch framing studs. The lower indicia 76 of the upper support arm 70 provide a point for the installer to bend the upper portion of the upper support arm 70 ninety degrees for forming thereof for use in the construction of walls comprised for example of five-and-one-half inch framing studs. The end flange 80 of the upper support arm 70 may be bent ninety degrees after forming thereof, for use in the construction of walls comprised for example of six inch framing studs.

Strengthening portions 78 of the upper support arm 70 strengthen and enhance the performance characteristics of the support bracket 10. In the bracket arm extension 42, the elongated slot 44 enables the snapping or breaking off thereof, for use with the upper support arm 70 to provide support in interior walls for example of greater than six inch depth, such as a staggered stud wall system in FIG. 7. The elongated side portions 48 strengthen the bracket extension arm 42, and the slot 44 enables slide-type adjustment therealong. The end flange 52 may be bent ninety degrees, to provide a flat surface area for the bracket extension arm 42 upon being pushed against the inside of the interior wall member, so as to press against the interior of one side of a staggered wall stud system and to support the top portion 66 of the upper support arm 70 against the interior of the opposite side of the staggered stud wall system. The overall outside dimension 54 of the finished wall surfaces may vary depending upon the construction plan drawings or specifications of a particular project. The screws 56, which extend through the slot 44 in the bracket extension arm 42, enable adjustment of the positioning thereof within the wall interior.

Referring to the drawings, and in particular to FIGS. 8-11, there is shown an article 90, comprising an embodiment of a support bracket, for enabling an electrical box enclosure to be adjustably positionable therein relative to the bottom of a framing member 92, in an interior wall section 94 during wall construction.

FIG. 1 presents the support bracket 10, which includes an adjustable positioning enabling section 18 for enabling the electrical box enclosure to be adjustably positionable therein. The adjustable positioning enabling section 18 includes side positioning portions 20 of the support bracket 10, shown in template form, which are bendable at about ninety degrees to form a channel guide for the electrical box enclosure 12, as seen in FIG. 4. The side positioning portions 20 each have a slot 22 extending therealong, for enabling adjustable positioning of the electrical box enclosure 12 in the support bracket 10. The slots 22 allow for up and down adjustment of the electrical box enclosure 12, as well as a machine screw attachment of the electrical box enclosure 12 to a floor bracket. The side positioning portions 20 each also include indicia 24 along the slot 22 therein, for indicating the adjustable positioning for the electrical box enclosure 12 therein. The electrical box enclosure 12 includes a pair of sides 26, and a pair of pointers, one on each side, and the indicia 24 in the support bracket 10 are alignable with the pointers on the electrical box enclosure 12 for alignment thereof.

The support bracket 10 further includes a supporting section 28, for supporting the adjustable positioning enabling section 14. The supporting section 28 includes a front portion 30 of the support bracket 10. The front portion 30 includes an upper portion 32 and a lower portion 34, and has an opening 36 for enabling the electrical box enclosure 12 to be mounted therein. A framing member 14 in an interior wall section 16 includes one of a plurality of different thickness framing studs 38.

Referring to FIGS. 1 and 5-7, the front portion opening 36 of the support bracket 10 includes a bottom portion 40, and a bracket extension arm 42 which extends from the lower portion 34 of the support bracket front portion 30 into the bottom portion 40 of the opening 36. The bracket extension arm 42 is bendable, and enables the securing of the support bracket 10 to one of the plurality of different thickness framing studs 38. The bracket extension arm 42 has a slot 44 extending therealong, for enabling a slide type adjustment over the front portion 30 of the support bracket 10. The bracket extension arm 42 also includes indicia 46 along the slot 44 therein, and elongated side portions 48, which are bendable. The bracket extension arm 42 further includes a separation-enabling portion 50, for enabling separation thereof from the front portion 30. The bracket extension arm 42 also includes an end flange 52 which is bendable.

There is shown in top view in FIG. 7, the end flange 52 of the bracket extension arm 42 which is bent approximately ninety degrees after tool forming, to provide a flat surface area for the bracket extension arm 42, when pushed against the inside of the interior wall material. An overall outside dimension 54 of a pair of finished wall surfaces may vary depending upon construction plan drawings or specifications for a particular project. A pair of accessible screws 56 enable adjustment of the bracket extension arm 42 within the interior of the wall. The end flange 52 of the bracket extension arm 42 bears against one side while supporting the upper portion of the support bracket 10 in stud wall systems against the exterior of the opposite side. The bracket extension arm 42 is able to support the upper portion of the support bracket 10 in stud wall systems beyond stud wall construction, such as in a staggered or double wall stud wall system as shown in FIG. 7.

The lower portion 34 of the front portion 30 of the support bracket 10 includes a bottom portion 58 which is bendable. The bottom portion 58 includes a separation-enabling portion 60 for enabling separation of the bottom portion 58 from the front portion 30. The separation-enabling portion 60 further comprises a pair of slots 62 extending along the bottom portion 58. The lower portion 34 of the support bracket front portion 30 further includes a hole 64 for enabling the securing of the support bracket 10 to the bottom of the framing member 14. The upper portion 32 of the support bracket front portion 30 further includes a top portion 66 which is bendable. The top portion 66 includes a plurality of slots 68, each able to receive a cable therein. Each of the plurality of slots 68 is generally u shaped.

The front portion 30 of the support bracket 10 also includes an upper support arm 70 which extends from the support bracket upper portion 32 into an upper portion 72 of the support bracket front portion opening 36, which is bendable, and which enables securing thereof to the framing member 14. The upper support arm 70 includes a plurality of holes 74 therein for enabling the securing thereof to the framing member 14. The framing member 14 in the interior wall section 16 includes one of a plurality of different thickness framing studs 38. The upper support arm 70 also includes indicia 76 associated therewith. The associated indicia 76 enables the securing of the upper arm support 68 to one of the plurality of different thickness framing studs 38. The upper support arm 68 further includes a strengthening portion 78 for strengthening the support bracket 10, and an end flange 80 which is bendable.

The support bracket 10 also includes side tab portions 82 which enable mounting of the article to the framing member 14. Each side tab portion 82 has a hole 84 therein for enabling mounting of the support bracket 10 to the framing member 14.

Referring to the drawings, FIGS. 8-14, there is shown an embodiment of the article which comprises a support bracket 90, which includes an adjustable positioning enabling section 92, for enabling an electrical junction box 94 to be adjustably positionable therein. The support bracket 90 further includes a securing section 96, for enabling securing of the electrical junction box to the support bracket. In FIGS. 12-14, the embodiment of the support bracket 90 is inverted relative to the wall system.

The adjustable positioning enabling section 92 includes a pair of opposed side portions 98 which are bendable. Each bendable side portion 98 includes a plurality of markings 100, and a plurality of holes 102 spaced apart therealong.

Figure 11:
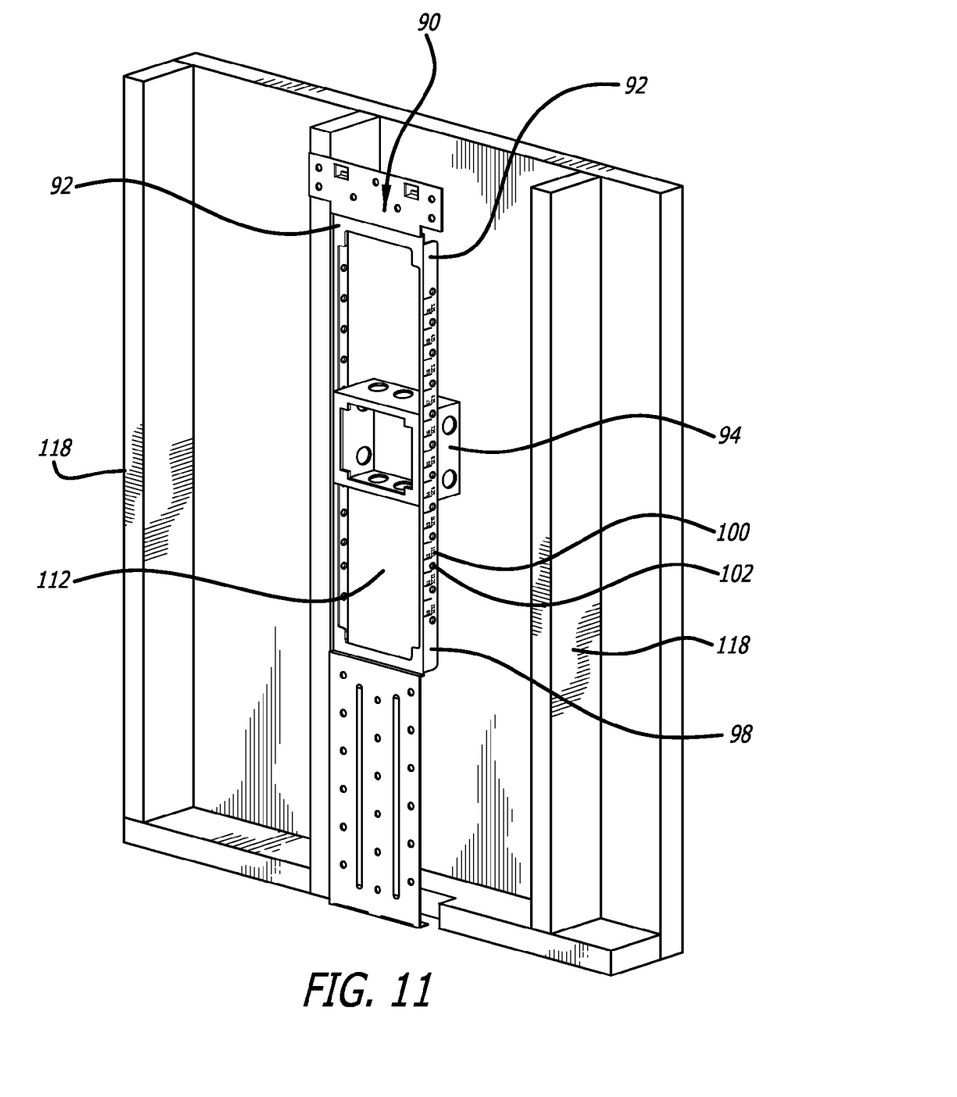
FIG. 11 is a perspective view of a support bracket article including bent portions, and an electrical box enclosure supported therein, in the embodiment, in a stud wall system.

As seen in FIG. 11, each hole 102 is able to receive a connector 104 which is able to connect with a corresponding hole 106 in a standard four-inch-square electrical junction box 94, for enabling securing the electrical junction box 94 to the support bracket 90. Alternatively, each hole 102 is able to receive a connector 104 able to connect with a corresponding hole 106 in a standard four-and-eleven-sixte3enths-inch-square electrical junction box 94, for enabling securing the electrical junction box 94 to the support bracket 90.

Figure 8:
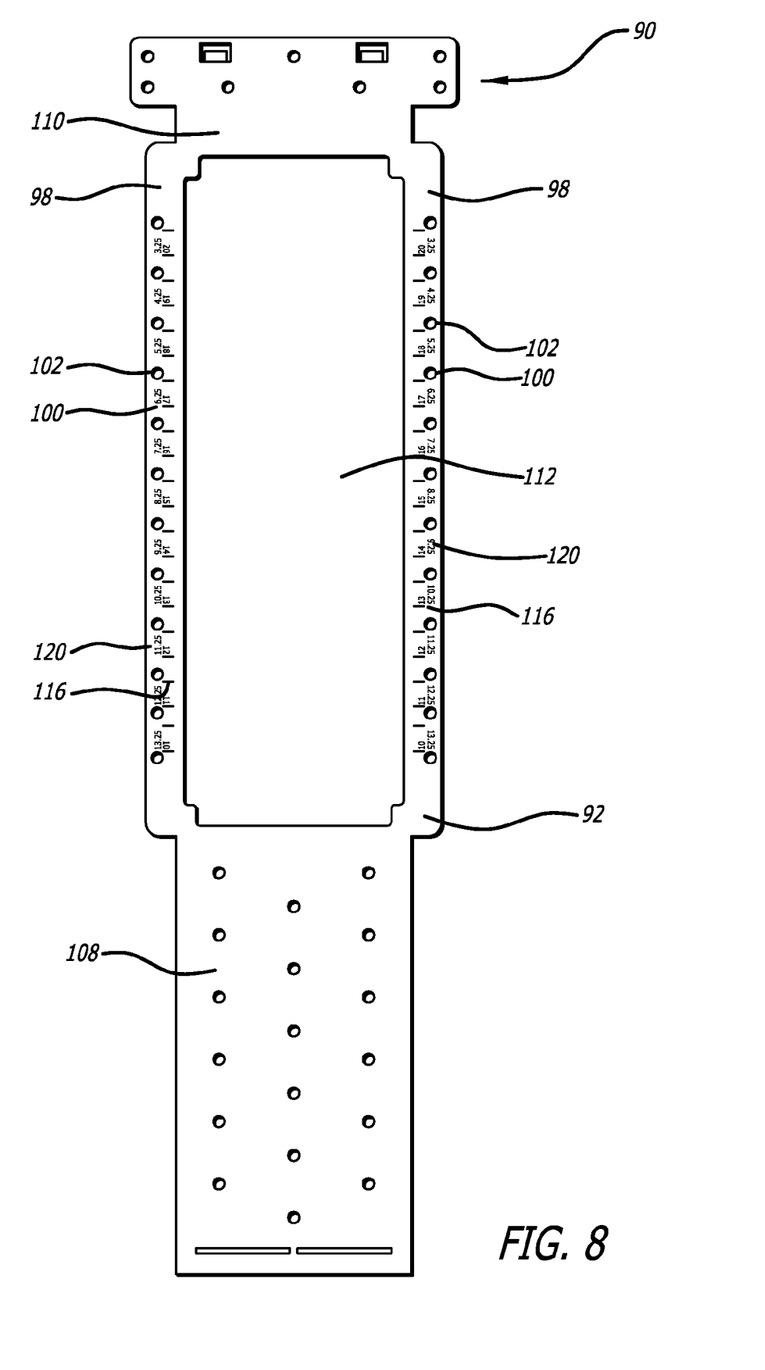
FIG. 8 is a front elevational view of a support bracket in an embodiment of the present invention.
Figure 9:
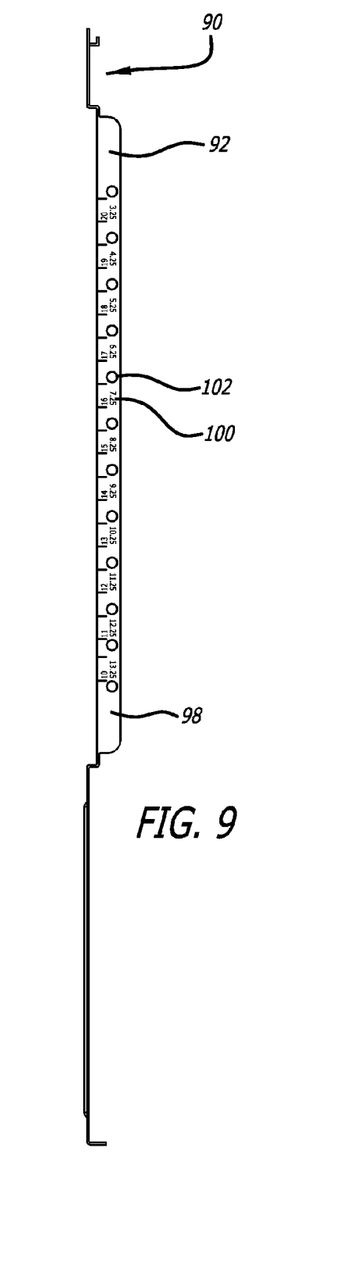
FIG. 9 is a side elevational view of a support bracket article including bent portions in the embodiment.
Figure 10:
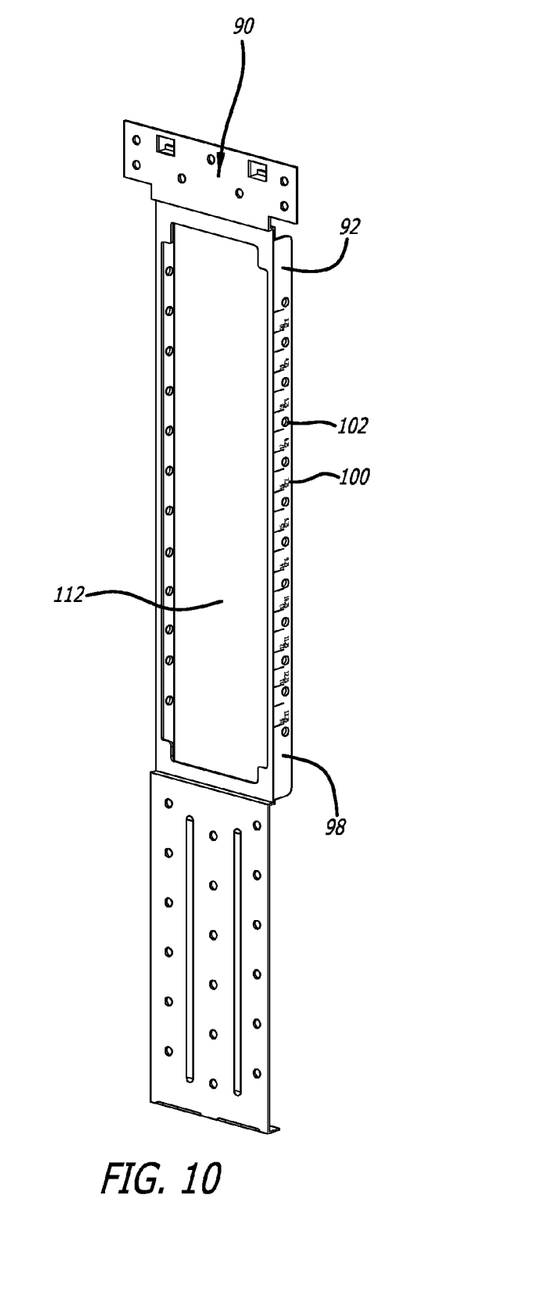
FIG. 10 is a perspective view of a support bracket article including bent portions in the embodiment.

FIGS. 8, 10-11 illustrate the adjustable positioning enabling section 92 which includes a front portion 108, which includes a top portion 110, and an opening 112 which is elongated and enlarged, and which is proximate the top portion 110. The opening 112 enables the electrical junction box 94 to clamp the support bracket 90 between a mud ring 114 and the electrical junction box 94 to enable adjustably positioning relative thereto. In a prefabricated configuration, the electrical junction box 94 includes pigtails therein, and the support bracket 90 enables the mud ring 114 to be loosened, whereby the support bracket 90 enables access to the pigtails in the electrical junction box 94 for connection of cables thereto, while preventing the electrical junction box 94 from falling to the ground upon loosening of the mud ring.

The plurality of markings 100 proximate each side portion 98, as shown in FIGS. 8-11, include a first set of markings 116, which indicate positioning of the electrical junction box 94 from the center of a stud 118 outwardly in a general horizontal direction, and a second set of markings 120 which indicate positioning of the electrical junction box 94 from the floor upwardly in a generally vertical direction.

From the foregoing it will be appreciated that the articles and methods of the present invention provide advantages during wall construction, in enabling the adjustable positioning of an electrical box enclosure in relation to a framing member in an interior wall section.

While the particular adjustable floor bracket articles and methods of the invention as shown and disclosed in detail herein are fully capable of obtaining the objects and providing the advantages previously stated, it is to be understood that they are merely illustrative of the presently preferred embodiment of the invention, and that no limitations are intended to the details of construction or design shown herein other than as described in the appended claims.

We claim:

1. An article for enabling an electrical junction box to be adjustably positionable therein relative to a framing member in an interior wall section during wall construction, comprising a support bracket, which comprises:
   an adjustable positioning enabling section, for enabling the electrical junction box to be adjustably positionable therein, which includes a pair of opposed side which are bendable, wherein each of the pair of opposed bendable side portions includes a plurality of markings, and wherein the plurality of markings in each side portion includes a first set of markings which indicate positioning of the electrical junction box from the center of a stud outwardly in a general horizontal direction, and a second set of markings which indicate positioning of the electrical junction box from the floor upwardly in a generally vertical direction; and
   a securing section, for enabling securing of the electrical junction box to the support bracket, which has a plurality of holes spaced apart along the pair of opposed side portions, each hole able to receive a connector able to connect with a corresponding hole in a standard four-inch square electrical junction box.

2. An article as in claim 1, the adjustable positioning enabling section includes a pair of opposed side portions of the article which are bendable.

3. An article as in claim 1, further able to enable a mud ring to be secured to the support bracket and the electrical junction box.

4. An article as in claim 1, wherein each of the pair of opposed bendable side portion includes a plurality of holes spaced apart there along, each hole able to receive a connector able to connect with a corresponding hole in a standard four-and-eleven-sixteenths-inch square electrical junction box, for enabling securing the electrical junction box to the support bracket.

5. An article as in claim 2, further including a front portion, wherein the front portion includes a top portion, an opening which is elongated and enlarged and which is proximate the top portion, which enables the electrical junction box to clamp the support bracket between the mud ring and the electrical junction box to be adjustably positionable relative thereto.

6. An article as in claim 3, wherein, in a prefabricated configuration, the electrical junction box includes pigtails therein, and the support bracket enables the mud ring to be loosened, to enable access to the pigtails in the electrical junction box for connection of cables thereto, while preventing the electrical junction box from falling to the ground upon loosening of the mud ring.

7. A method of enabling an electrical junction box to be adjustably positionable in an article relative to a framing member in an interior wall section during wall construction, wherein the article comprises a support bracket, which includes an adjustable positioning enabling section, for enabling the electrical junction box to be adjustably positionable therein, which includes a pair of opposed side which are bendable, wherein each of the pair of opposed bendable side portions includes a plurality of markings, and wherein the plurality of markings in each side portion includes a first set of markings which indicate positioning of the electrical junction box from the center of a stud outwardly in a general horizontal direction, and a second set of markings which indicate positioning of the electrical junction box from the floor upwardly in a generally vertical direction, and a securing section, for enabling securing of the electrical junction box to the support bracket, which has a plurality of holes spaced apart along the pair of opposed side portions, each hole able to receive a connector able to connect with a corresponding hole in an electrical junction box, wherein the method comprises:

enabling adjustable positioning of the electrical junction box in the support bracket, from the center of a stud outwardly in a general horizontal direction, by the first set of markings, and from the floor upwardly in a generally vertical direction, by the second set of markings; and enabling securing of the electrical junction box to the support bracket in the securing section, by a connector able to connect with a corresponding hole in a side portion of an standard four-inch square electrical junction box.

8. A method as in claim 7, wherein the supporting section in the article includes a front portion of the support bracket, and wherein adjustable positioning enabling in the method further comprises enabling adjustable positioning in the support bracket which includes the supporting section front portion.

9. A method as in claim 7, wherein the article is further able to enable a mud ring to be secured to the support bracket and the electrical junction box, and wherein adjustable positioning enabling in the method further comprises enabling the mud ring to be secured to the support bracket and the electrical junction box.

* * * * *